United States Patent

[11] 3,596,854

| [72] | Inventor | William R. Haney, Jr.<br>135 Chestnut Lane, Cleveland, Ohio 44143 |
|---|---|---|
| [21] | Appl. No. | 831,560 |
| [22] | Filed | June 9, 1969 |
| [45] | Patented | Aug. 3, 1971 |

[54] VORTEX GENERATOR FOR AIRFOIL STRUCTURES
23 Claims, 9 Drawing Figs.

[52] U.S. Cl. .................................................. 244/40
[51] Int. Cl. ...................................................... B64c 21/06
[50] Field of Search .......................................... 244/40, 42, 41, 42.47, 42.41, 42.48, 45, 130, 62; 239/468

[56] References Cited
UNITED STATES PATENTS

| 3,480,234 | 11/1969 | Cornish | 244/130 X |
| 1,310,815 | 7/1919 | Weaver | 244/136 X |
| 2,650,781 | 9/1953 | Taylor | 244/130 X |
| 3,003,705 | 10/1961 | Johnson | 239/468 X |
| 3,012,740 | 12/1961 | Wagner | 244/42 |
| 3,199,813 | 8/1965 | Roper | 244/130 X |
| 3,411,738 | 11/1968 | Sargent | 244/40 |

FOREIGN PATENTS

| 419,541 | 11/1934 | Great Britain | 239/469 |
| 1,157,595 | 5/1958 | France | 244/40 |

Primary Examiner—Milton Buchler
Assistant Examiner—Carl A. Rutledge
Attorney—John N. Wolfram ABSTRACT: A vortex generator for the ends of airfoil structures that directs air on the high-pressure side of the structure into a vortex generator chamber and discharges the swirling air at the trailing edge of the structure. The exit orifice of the vortex generator may be directed at fixed or variable attitudes for causing the vortex created by the generator to either increase or decrease lift provided by the airfoil structure.

PATENTED AUG 3 1971　　　3,596,854

INVENTOR.
WILLIAM R. HANEY, JR.
BY
John N. Wolfram
ATTORNEY

VORTEX GENERATOR FOR AIRFOIL STRUCTURES

BACKGROUND OF THE INVENTION

Due to the well-known shaping of aircraft wings with the upper surface having a longer surface than the lower surface, air passing over the wing travels faster than the air passing below the wing, thereby lowering the air pressure above the wing compared to the pressure below the wing and creating lift. At the wing tip some of the higher pressure air on the underneath side spills sideward off the end of the wing and up over the top side. This spilled air effectively pushes down on the wing to reduce the lift and it also produces a trailing vortex that produces drag upon the wing. Thus with conventional aircraft wings a significant amount of propulsion power is wasted in overcoming the drag of such vortices and the additional drag resulting from the higher angle of attack of the wings required to compensate for reduced lift. A similar condition occurs with other airfoil structures such as ailerons.

SUMMARY OF THE INVENTION

This invention substantially eliminates sideward spilling of air from the high-pressure side of an airfoil structure at its tip or end to the low-pressure side by gathering the high-pressure air that would otherwise spill over the tip and directing it into a vortex chamber that swirls the air and discharges it from the trailing edge of the structure. As the swirling air leaves the vortex chamber it entrains other air adjacent the end of the structure that would otherwise form a turbulent drag producing pattern and directs it into the more efficient or less drag producing full span vortex pattern of the air discharged from the vortex generator. The generator may be provided with means of various types, such as a tangential opening, spiral vanes, etc., for producing the swirling action and also with a tube to produce ram air pressure within the generator for increasing the effectiveness of the latter.

In some forms of the invention the discharge orifice of the generator may be so located that its axis is substantially in the line of flight so that the vortex produced thereby increases lift and reduces drag over conventional wing tip structures.

In other forms the discharge orifice either may be directed outwardly from the aircraft fuselage so as to further increase the vortex span or may be directed inwardly of the fuselage to reduce the vortex span.

In other forms of the invention the discharge orifice of the generator may be gimbal mounted for selective variable positioning while the aircraft is in flight.

DESCRIPTION

Figure 1:
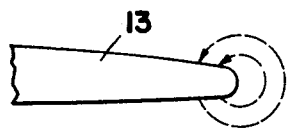
FIG. 1 is a rear view of part of a conventional aircraft wing showing how high-pressure air from underneath the wing rolls over the wing tip to the low-pressure area above the wing.

The vortex generator 9 shown in FIGS. 1—6 includes a housing 10 that has a generally cylindrical chamber 11 closed at its front end and has a discharge orifice 12 at its rear. If projects below the bottom of wing 13 and has a longitudinal substantially tangential slot or opening 14 along the lower surface of the wing. Slot 14 may extend nearly across the width of the wing tip, or it may be located toward the leading edge.

Figure 2:
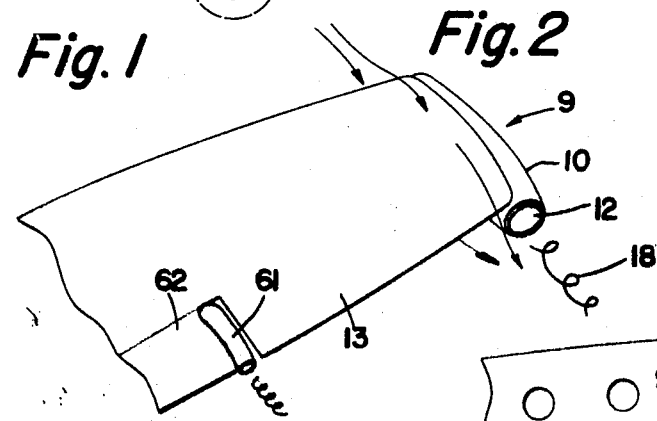
FIG. 2 is a perspective view of a wing portion having a vortex generator of the present invention at the wing tip and also on an aileron.
Figure 3:
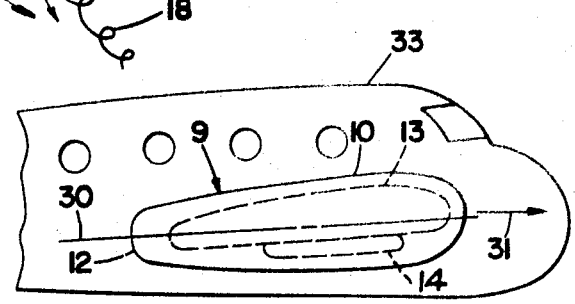
FIG. 3 is an end view of a wing and one form of vortex generator.
Figure 4:
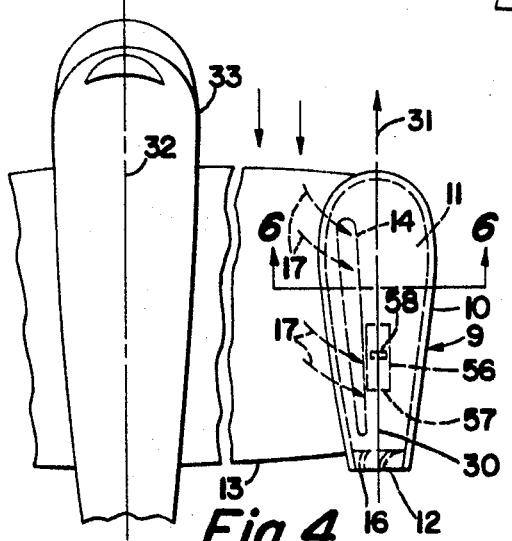
FIG. 4 is a broken plan view of an aircraft showing the vortex generator of FIG. 3.

As air passes over and under wing 13, the higher pressure air on the bottom side near the wing tip moves sideward toward the wing tip edge, as shown by the dotted arrows 17 in FIG. 4, but instead of rolling around the wing tip to the low-pressure upper side, as would be the case with a conventional wing 13 as shown in FIG. 1, it enters vortex generator chamber 11 via slot 14 in a direction generally tangential to the chamber wall. This causes the air to rotate or swirl within the chamber as indicated by the arrows in FIG. 6. Rotational velocity is retained by the air as it is expelled from orifice 12 so as to result in a trailing vortex 18, as shown in FIG. 2, of controlled pattern that imposes less drag to the aircraft than the random turbulence and vortex patterns created by conventional wing tips. The trailing vortex entrains other air leaving the wing from its upper and lower surfaces near the wing tip that would otherwise create turbulence and drag to further reduce these effects. By gathering higher pressure air that would otherwise roll over the wing tip edge to the lower pressure upper side, the vortex generator also eliminates the corresponding reduction in lift.

Figure 5:
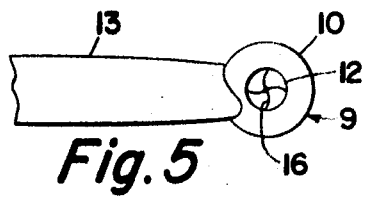
FIG. 5 is a rear view of the wing tip and the vortex generator of FIG. 3.
Figure 6:
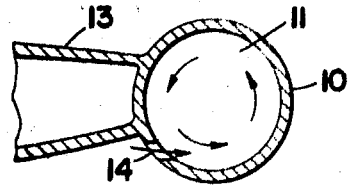
FIG. 6 is a section view on lines 6—6 of FIG. 4.

To increase the swirling action of the air as it discharges from orifice 12, the latter may be fitted with angularly oriented swirler vanes or fins 16, as shown in FIGS. 4 and 5.

Figure 7:
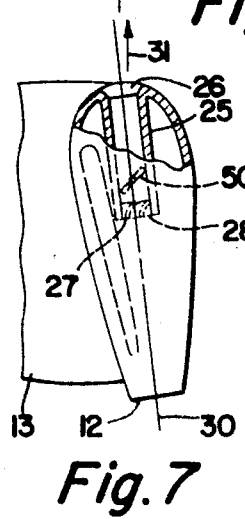
FIG. 7 and 8 are top part sectional views of other forms of vortex generators.

FIG. 7 shows the use of a ram air tube 25 centrally located at the forward end of generator 9. The tube has a flared opening 26 to atmosphere at its forward end and its rear end is open at 27 to the interior of the generator. Air passing through tube 25 increases the mass and velocity of the air ejecting from the generator and forming the trailing vortex and causes a more precise and efficient vortex pattern to be formed. If desired, tube 25 may be fitted with a swirler 28.

Figure 8:
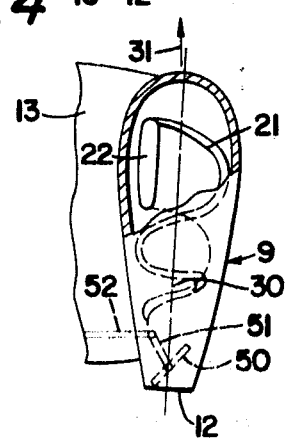

FIG. 8 illustrates the use of spiral vanes or baffles 21 within chamber 11 as an alternate method of increasing swirling of the air within the generator and for directing it to the discharge orifice for expulsion as a controlled vortex. In this arrangement opening 22 is in the same relative location below the wing 13 as in FIG. 6 except that it is confined to the forward portion of the wing tip.

In FIGS. 2 through 6 the vortex generators 9 are so mounted that the axis 30 of each discharge orifice 13 is substantially parallel with the line of flight (arrow 31) and the longitudinal axis 32 of the fuselage 33 when viewed from the top, as in FIG. 4. When viewed from the side, as in FIG. 3, the axis 30 has the same angle of incidence with the fuselage 33 as does the wing 13.

In some applications it may be desirable to make further increase in the lift provided by the wing, as for lowering the stall speed of the aircraft, by mounting the generator so that its discharge orifice axis 30 is directed away from (divergent to) the fuselage axis 32 (or the line of flight 31) when progressing from the front of the aircraft to the rear as the wing is viewed from the top as in FIG. 7. This increases the effective vortex span of the wing to further increase the lift but also results in a greater induced angle of attack and hence somewhat greater drag.

In other applications where lower drag at high speed is desired, the generator may be mounted so that its orifice axis 30 is directed toward (convergent to) the fuselage axis (or line of flight 31) as viewed in FIG. 8. This results in a reduction of the induced angle of attack and hence a reduction in lift.

Figure 9:
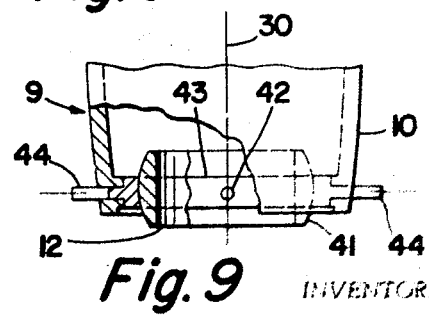
FIG. 9 is a fragmentary part sectional view of still another form.

In the modification illustrated in FIG. 9 the discharge orifice 12 is formed in a gimbal-mounted member 41 that is capable of universal movement. Thus member 41 has pins 42 on its upper and lower sides that are rotatably journaled in a gimbal ring 43. The latter has pins 44 on its left and right sides journaled in generator housing 10. Suitable devices not shown, may be attached to the pins 42, 44, or to the member 41 and ring 43, for rotating the same as desired while the aircraft is in flight so as to selectively place the discharge orifice axis 30 in either of the directions illustrated in FIGS. 2 through 8. In addition the parts may be rotated so that axis 30 may be directed downwardly or upwardly, or in any combination of vertical and lateral directions.

When axis 30 in FIG. 9 is directed downwardly it increases effectively lift and when directed upwardly reduces effective lift. When directed outwardly or inwardly effective lift is respectively increased or decreased, as in the manner of FIGS. 7 and 8.

In a further modification, any of the forms of the invention disclosed herein may be fitted with a valve to vary the flow of air through the discharge orifice. For example, in FIG. 8 there is shown a butterfly valve 50 whose position may be varied by means of a handle 51 and a control rod 52 for selectively varying the size of the discharge orifice 12 to thus control the effectivity of the vortex created by the generator. Likewise, a valve 50 may be placed within ram tube 25 in the FIG. 7 form, as illustrated.

In a still further modification, any of the forms of the invention disclosed herein may have installed within the corresponding housing 10 a gas turbine or other compressor, as illustrated at 56 in FIG. 4, with its discharge end 57 facing the rear of housing 10 and having a throttle control rod 58 suitably mounted for manual or automatic manipulation or control.

As shown in FIG. 1, vortex generators according to this invention may also be applied to parts of aircraft other than the wing tip, as for example, a generator 61 may be applied to the sides or edges of an aileron 62.

I claim:

1. In combination with an airfoil structure comprising a body having opposed first and second surfaces with front, rear and tip edges and shaped so that when exposed to an airstream having an initial direction generally from said front to rear edges and passing over both surfaces a higher air pressure is produced against the first surface than against the second, a housing at the tip edge defining a chamber, said housing having a discharge orifice facing generally rearwardly, and a first opening in said chamber exposed to said first surface to receive high-pressure air therefrom whereby air entering said chamber at said first opening is expelled through said discharge orifice.

2. The combination of claim 1 in which said chamber is generally cylindrical with its longitudinal axis extending generally in the direction of said airstream.

3. The combination of claim 1 in which the chamber has a second opening facing frontwardly so as to receive air approaching from said initial direction to develop a ram pressure within the chamber.

4. The combination of claim 1 in which there is a means to impart swirling motion to air passing through said chamber to said discharge orifice.

5. The combination of claim 4 in which said means comprises a spirally shaped deflector within the chamber.

6. The combination of claim 4 in which said means is at said discharge orifice.

7. The combination of claim 4 in which said means is a tangential positioning of the first opening to the chamber.

8. The combination of claim 1 in which said chamber is of gradually reducing diameter toward said discharge orifice for a greater part of its length.

9. The combination of claim 1 in which said first opening faces in a direction generally transverse to said initial direction of said airstream.

10. The combination of claim 1 in which said chamber projects beyond the first surface in a direction normal to the latter and away from the second surface, and said first opening is in said projection.

11. The combination of claim 3 in which the second opening opens to a tube extending longitudinally within the chamber.

12. The combination of claim 1 in which the axis of the discharge orifice is generally parallel with said initial direction of airflow when viewed in a direction from the second surface toward the first surface.

13. The combination of claim 1 in which the axis of the discharge orifice is at an angle with said initial direction of airflow when viewed in a direction from the second surface toward the first surface.

14. The combination of claim 1 in which there is a means for selectively varying the angle of the axis of the discharge orifice relative to the longitudinal axis of the chamber.

15. The combination of claim 1 in which there is a means for varying the size of the discharge orifice.

16. The combination of claim 1 in which there is a compressor within the chamber operable to discharge air under pressure toward said discharge orifice.

17. A vortex generator for an aircraft structure comprising a generally cylindrical housing forming a chamber with a discharge orifice at one end and an elongated lateral opening in its sidewall extending generally axially along the housing for admitting air to the chamber.

18. The generator of claim 17 in which the chamber contains a means for causing air to discharge from said orifice with a swirling motion.

19. The generator of claim 17 in which the chamber contains means for selectively varying the discharge orifice opening.

20. The generator of claim 17 in which the chamber contains means for varying the angle of the discharge orifice axis relative to the axis of the chamber.

21. The generator of claim 17 in which the chamber contains a means for increasing the velocity of air discharged from said orifice.

22. The generator of claim 17 in which the lateral opening communicates with the exterior of the housing at said cylindrical wall.

23. The generator of claim 22 in which the cylindrical wall is devoid of projections at said lateral opening.